(12) United States Patent
Hansen et al.

(10) Patent No.: US 11,248,647 B2
(45) Date of Patent: Feb. 15, 2022

(54) EME CAP FOR PREVENTING UNCURED SEALANT SQUEEZE OUT

(71) Applicant: THE BOEING COMPANY, Chicago, IL (US)

(72) Inventors: Darrin M. Hansen, Seattle, WA (US); Benjamin P. Hargrave, Bellevue, WA (US); Carissa Pajel, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 16/185,500

(22) Filed: Nov. 9, 2018

(65) Prior Publication Data

US 2020/0149579 A1 May 14, 2020

(51) Int. Cl.
*F16B 37/14* (2006.01)
*F16B 33/00* (2006.01)

(52) U.S. Cl.
CPC ............ *F16B 37/14* (2013.01); *F16B 33/004* (2013.01)

(58) Field of Classification Search
CPC ....... F16B 33/004; F16B 37/14; Y10S 411/91
USPC ...................................... 411/372.5, 373, 377
See application file for complete search history.

(56) References Cited

U.S. PATENT DOCUMENTS

| 1,368,637 | A | 2/1921 | McFarland |
| 1,868,084 | A | 7/1932 | Wheelwright |
| 2,109,035 | A * | 2/1938 | Schafer ................. A44C 17/04 384/425 |
| 3,241,427 | A * | 3/1966 | Bosler .................... F16B 37/14 411/368 |
| 3,618,444 | A * | 11/1971 | Kay et al. ............ F16B 33/004 411/373 |

(Continued)

FOREIGN PATENT DOCUMENTS

| CA | 2856687 A1 | 3/2015 |
| CA | 2858461 A1 | 3/2015 |

(Continued)

OTHER PUBLICATIONS

European Search Report for EP Application No. EP19217717 dated May 8, 2020.

(Continued)

*Primary Examiner* — Roberta S Delisle
(74) *Attorney, Agent, or Firm* — Marshall, Gerstein & Borun LLP

(57) ABSTRACT

A containment apparatus for enclosing a metallic fastener extending through a structure includes a cap member. The cap member includes a first wall member which defines a first cavity and a first end. The first end defines a first opening providing access into the first cavity for at least a portion of the metallic fastener. The cap member further includes a second wall member secured to and extends from an exterior surface of the first wall member. The second wall member extends spaced apart from and along the first wall member to a first end. The second wall member surrounds the first wall member such that first wall member and second wall member form a second cavity positioned between the first wall member and the second wall member. The first end of the first wall member and the first end of the second wall member are coplanar with one another.

20 Claims, 6 Drawing Sheets

(56) References Cited

U.S. PATENT DOCUMENTS

| | | | |
|---|---|---|---|
| 3,699,368 A | 10/1972 | Palmer | |
| 4,013,190 A | 3/1977 | Wiggins et al. | |
| 4,519,974 A | 5/1985 | Bravenec et al. | |
| 4,630,168 A | 12/1986 | Hunt | |
| 4,636,446 A | 1/1987 | Lee | |
| 4,826,380 A | 5/1989 | Henry | |
| 4,850,778 A | 7/1989 | Clough et al. | |
| 4,884,933 A | 12/1989 | Preusker et al. | |
| 5,108,853 A | 4/1992 | Feres | |
| 5,752,794 A | 5/1998 | Krawczak | |
| 6,053,683 A | 4/2000 | Cabiran | |
| 6,102,128 A | 8/2000 | Bridgeman | |
| 6,318,942 B1 | 11/2001 | Wieczorek | |
| 7,134,666 B2 | 11/2006 | Beyssac et al. | |
| 7,755,876 B2 | 7/2010 | Morrill et al. | |
| 7,918,081 B2 | 4/2011 | Schlichting et al. | |
| 7,936,550 B2 | 5/2011 | Morrill et al. | |
| 8,318,942 B2 | 11/2012 | Zhang | |
| 8,388,293 B2 | 3/2013 | Hutter, III | |
| 8,711,541 B2 | 4/2014 | Umemoto et al. | |
| 8,717,735 B2 | 5/2014 | Day et al. | |
| 8,717,736 B2 | 5/2014 | Asahara et al. | |
| 8,840,740 B2 | 9/2014 | Rorabaugh et al. | |
| 8,894,338 B2* | 11/2014 | Dobbin | F16B 39/225 411/373 |
| 9,133,874 B2 | 9/2015 | Hill | |
| 9,188,226 B2 | 11/2015 | Pajel et al. | |
| 9,228,604 B2 | 1/2016 | Dobbin | |
| 9,764,854 B2 | 9/2017 | Dobbin et al. | |
| 10,151,337 B2 | 12/2018 | Hill | |
| 10,729,043 B1* | 7/2020 | Boettcher | H05K 9/0015 |
| 2002/0192052 A1 | 12/2002 | Ruspa | |
| 2008/0137259 A1 | 6/2008 | Heeter et al. | |
| 2009/0194297 A1 | 8/2009 | Ortiz Teruel | |
| 2010/0303582 A1 | 12/2010 | Choi et al. | |
| 2012/0217673 A1 | 8/2012 | Hutter, III | |
| 2013/0206759 A1 | 8/2013 | Wurz et al. | |
| 2013/0322982 A1* | 12/2013 | Dobbin | F16B 37/14 411/82 |
| 2014/0048198 A1 | 2/2014 | Dobbin et al. | |
| 2014/0261956 A1 | 9/2014 | Wiseman et al. | |
| 2014/0341675 A1 | 11/2014 | Dobbin | |
| 2015/0060465 A1 | 3/2015 | Limbacher et al. | |
| 2015/0082603 A1 | 3/2015 | Rawdon et al. | |
| 2015/0086295 A1 | 3/2015 | Cameron et al. | |
| 2015/0184688 A1 | 7/2015 | Dobbin et al. | |
| 2015/0345533 A1 | 12/2015 | Hill | |
| 2016/0131179 A1 | 5/2016 | Prouty et al. | |
| 2016/0159493 A1* | 6/2016 | Dobbin | F16B 33/004 411/82.1 |
| 2016/0195125 A1* | 7/2016 | Dobbin | B64D 45/02 411/82.1 |
| 2016/0245330 A1* | 8/2016 | Dobbin | F16B 37/14 |
| 2017/0021209 A1 | 1/2017 | Damazo et al. | |
| 2017/0050746 A1 | 2/2017 | Dobbin | |
| 2017/0321411 A1* | 11/2017 | Junca | F16B 33/006 |
| 2019/0241276 A1 | 8/2019 | Dobbin | |

FOREIGN PATENT DOCUMENTS

| | | |
|---|---|---|
| DE | 1085586 B | 7/1960 |
| EP | 2698318 A2 | 2/2014 |
| EP | 2713065 A2 | 4/2014 |
| EP | 2812248 A1 | 12/2014 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| EP | 3546374 A1 | 10/2019 |
| JP | H03125911 U | 12/1991 |
| JP | 2001165138 A | 6/2001 |
| JP | 2002266832 A | 9/2002 |
| RU | 2014128760 A | 2/2016 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Toulouse, Mixed Metal-Composite Assembly, May 2013.
Boeing Proprietary, Zap Caps as Alternative to Seal Caps—Task No. 17728-01, dated Aug. 19, 2016, 30 pages.
Boeing Proprietary, Zap Cap Further Screening Test Plan for 787 Fuel Tank Use, Mar. 24, 2016, 24 pages.
Hutchinson Proprietary Document, Accessories: TP Nutcaps, 1 page.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Bart Stevens et al., U.S. Appl. No. 15/960,835, filed Apr. 24, 2018.
Sean Auffinger et al., U.S. Appl. No. 16/046,316, filed Jul. 26, 2018.
Novaria/ESNA Design, dated Jul. 14, 2017, 3 pgs.
Boeing Part Standard, BACC50AP, dated Feb. 2, 2017, 16 pgs.
Click Bond Cap dated May 16, 2016, 4 pgs.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
Extended EP Search Report for EP Application No. 19204019.4 dated Mar. 30, 2020.
Written Opinion for EP Application No. 19204019.4 dated Mar. 30, 2020.
Extended European Search Report for EP Application No. 20176033.7 dated Oct. 23, 2020.
Extended EP Search Report for EP Application No. 19207962.2 dated Mar. 26, 2020.
Color Photographs of Boeing Proprietary, Zap Cap Further Screening Test Plan for 787 Fuel Tank Use, Mar. 24, 2016, 2 pg.
Extended European Search Report for EP Application No. 21161373.2 dated Jul. 21, 2021.

(56) References Cited

OTHER PUBLICATIONS

Non-Final Office Action for U.S. Appl. No. 16/420,948 dated Oct. 29, 2021.

* cited by examiner

EME CAP FOR PREVENTING UNCURED SEALANT SQUEEZE OUT

FIELD

This disclosure relates to an electrical insulation containment apparatus which electrically insulates a metallic fastener from transmitting electrical current or sparks into a vicinity of the location of the metallic fastener upon an occurrence of an electromagnetic effect ("EME") or lightning strike event and more particularly to an electrical insulating cap member containing sealant which encloses the metallic fastener within the cap member and a structure surface from which the metallic fastener extends.

BACKGROUND

Electrical insulation containment apparatus such as cap members made of cured sealant material, which also contains sealant, have been used to cover, enclose and electrically insulate an end portion of a metallic fastener assembly extending from a structure surface. The metallic fastener assembly can include a wide range of fasteners wherein the end portion can include, for example, a nut and a threaded end portion of a stud or bolt or a bolt head along with washers as well as other such configurations. The cap member confines the end portion of the metallic fastener within the cap member and the structure surface from which the metallic fastener extends.

A portion of the uncured sealant, which is positioned within the cap member, is often displaced by the end portion of the metallic fastener being inserted into the cap member during installation of the cap member. The uncured sealant which is displaced is squeezed out between the edge of the cap member and the structure surface to which the edge of the cap member is to abut with the cap member being installed. The uncured sealant from the cap member is positioned on the structure surface and positioned about the cap member.

The unsecured sealant expelled or squeezed out of the cap member is then smoothed out about the containment cap to ensure proper sealing of the cap member. The smoothing process of the unsecured sealant is tedious and time consuming. In addition, after the uncured sealant has been smoothed out, the sealant, which is positioned outside of the cap member, is also subjected to visual inspection, adhesion testing and post adhesion inspections. As a result, there is a need to design a cap member, which contains uncured sealant, for electrically insulating a metallic fastener, such that with installation of the cap member which prevents the occurrence of uncured sealant escaping the confinement of the cap member.

SUMMARY

An example includes a containment apparatus for enclosing a metallic fastener extending through a structure, which includes a cap member. The cap member includes a first wall member which defines a first cavity and a first end, wherein the first end defines a first opening providing access into the first cavity for at least a portion of the metallic fastener. The cap member further includes a second wall member secured to and extends from an exterior surface of the first wall member. The second wall member extends spaced apart from and along the first wall member to a first end and the second wall member surrounds the first wall member such that first wall member and second wall member form a second cavity positioned between the first wall member and the second wall member. The first end of the first wall member and the first end of the second wall member are coplanar with one another.

An example includes a method of installing a containment apparatus for enclosing a metallic fastener extending from a structure includes a step of placing an uncured sealant into a first cavity of a cap member. The cap member includes a first wall member which defines the first cavity and a first end, wherein the first end defines a first opening providing access into the first cavity for at least a portion of the metallic fastener. The cap member further includes a second wall member secured to and extends from an exterior surface of the first wall member, wherein the second wall member extends spaced apart from and extends along the first wall member to a first end of the second wall member. The second wall member surrounds the first wall member such that the first wall member and the second wall member form a second cavity positioned between the first wall member and the second wall member. The first end of the first wall member and the first end of the second wall member are coplanar with one another. The method further includes a step of inserting at least a portion of the metallic fastener into the first cavity.

DESCRIPTION

Figure 1:
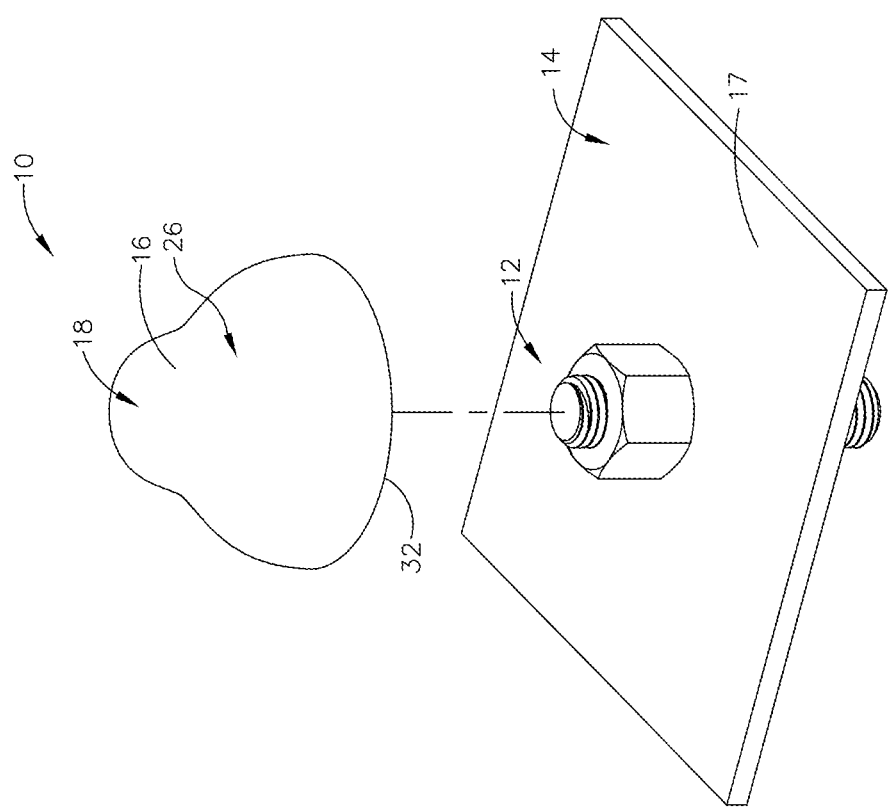
FIG. 1 is an exploded perspective view of a containment apparatus for enclosing an end portion of a metallic fastener and a structure from which the metallic fastener extends.
Figure 2:
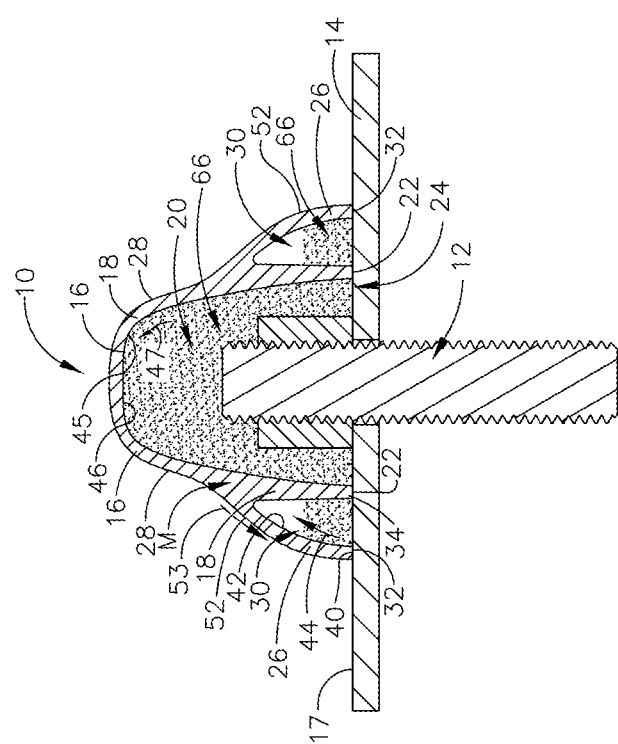
FIG. 2 is a cross section view of the containment apparatus of FIG. 1 positioned against the structure surface enclosing the portion of the metallic fastener which extends from the structure surface.
Figure 3:
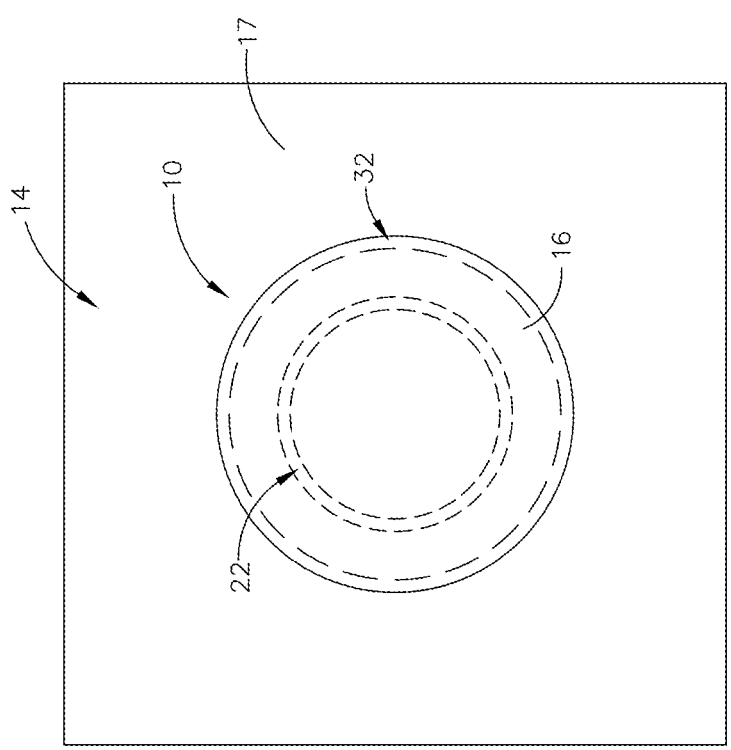
FIG. 3 is a top plan view of the containment apparatus of FIG. 2 installed on the structure surface from which a metallic fastener extends.
Figure 4:
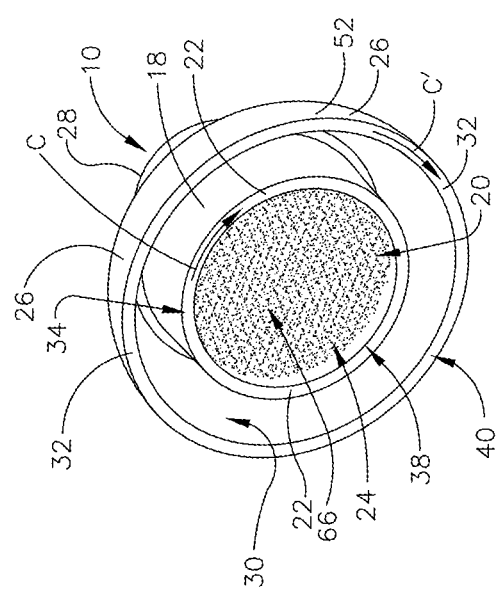
FIG. 4 is a perspective view into the containment apparatus of FIG. 1 with uncured sealant positioned within a first cavity of the containment cap before the containment cap is installed enclosing the end portion of the metallic fastener.
Figure 5:
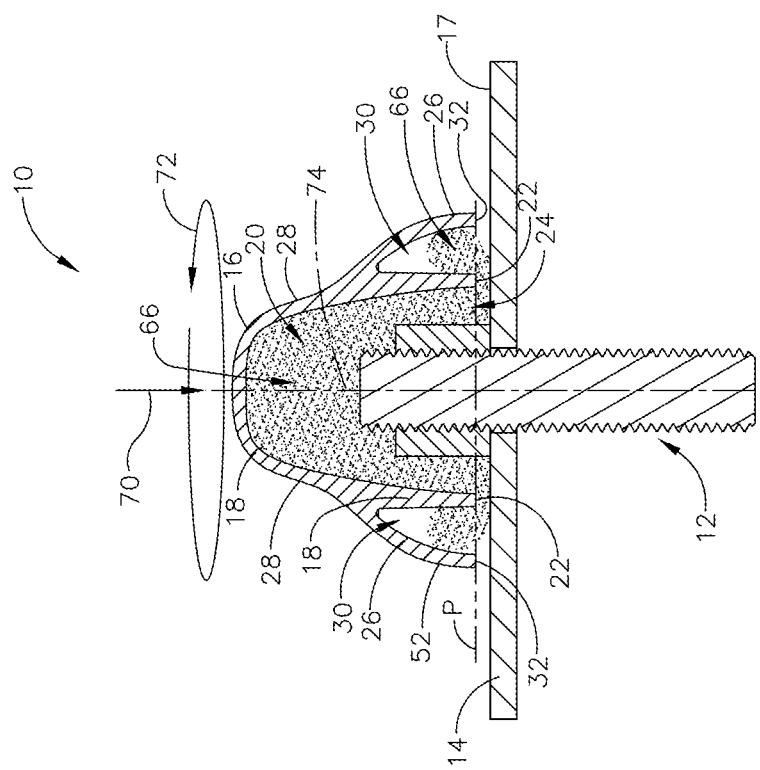
FIG. 5 is a cross section view of the containment apparatus of FIG. 2 being installed.

In referring to FIGS. 1-3, containment apparatus 10 for enclosing metallic fastener 12 extending through structure 14 is shown. Cap member 16 of containment apparatus 10 includes first wall member 18, which defines first cavity 20 and first end 22, wherein first end 22 defines first opening 24 providing access into first cavity 20 for at least a portion of metallic fastener 12. Second wall member 26 is secured to and extends from exterior surface 28 of first wall member 18. Second wall member 26 extends spaced apart from and along first wall member 18 to first end 32. Second wall member 26 can be connected to first wall member 18 as separate parts or can be integrally molded as a single part. Second wall member 26 surrounds first wall member 18, as seen in FIG. 4, such that first wall member 18 and second wall member 26 form second cavity 30 positioned between first wall member 18 and second wall member 26. First end 22 of first wall member 18 and first end 32 of second wall member 26 are coplanar with one another positioned within plane P as seen in FIG. 5. This configuration of cap member 16 provides for confining uncured sealant so as not to become squeeze out uncured sealant from cap member 16 during installation. In avoiding uncured sealant exiting cap member 16, substantial labor and cost can be avoided in not having to smooth out exited uncured sealant. In addition, second cavity 30 confines uncured sealant which has been displaced out of first cavity 20 from the insertion of metallic fastener 12 into first cavity 20 during installation. The uncured sealant confined within second cavity 30, when cured, provides additional securement of cap member 16 to structure 14 that is provided by cured sealant positioned within first cavity 20.

Cap member 16 can be constructed in one of a variety of fabrication processes such as for example various molding techniques or additive manufacturing and from one of a wide variety of materials such as for example thermoplastic or thermoset materials. Thermoplastic materials can include, for example, such compositions as acrylonitrile butadiene styrene, polyactic acid, polyvinyl alcohol, polycarbonate and polyetherimide or other like compositions. Thermoset materials can include, for example, such compositions as polysulfide, polythioether, polyurethane, epoxy, acrylate or polyimide or other like compositions.

In referring to FIGS. 2 and 4, first end 22 in this example includes flat surface 34. Flat surface 34 of first end 22 extends in circular direction C, as seen in FIG. 4, defining first opening 24 having circular configuration 38. Flat surface 34 provides for reliable confinement of metallic fastener 12 with cap member 16 positioned against a flat surface of structure 14 and the circular configuration provides ease in manufacturing of cap member 16 provides a versatile configuration in engaging different shaped metallic fasteners 12. First end 32 of second wall member 26 includes, in this example, flat surface 40. Flat surface 40 provides for a reliable confinement for second cavity 30 in preventing uncured sealant from exiting second cavity 30 and be positioned outside of cap member 16. Flat surface 40 of first end 32 of second wall member 26 and flat surface 34 of first end 22 of first wall member 18 are spaced apart from one another and flat surface 40 of first end 32 of second wall member 26 surrounds flat surface 34 of first end 22 of first wall member 18. Flat surface 40 of second wall member 26 extends in circular direction C'. Flat surfaces 34 and 40 provide a concentric configuration, as seen in FIG. 4. The spaced surrounding of second wall member 26 about first wall member 18 provides second cavity 30 for securing and storing uncured sealant within second cavity 30 and prevent uncured sealant initially positioned within first cavity 20 to exit cap member 16.

As seen FIG. 2, in this example, first wall member 18 and second wall member 26 is integral with one another, which provides for ease in manufacturing and reduction in cost with respect to assembling. First wall member 18 and second wall member 26 are joined together at location M spaced apart from first end 22 of first wall member 18 and first end 32 of second wall member 26. This configuration of first wall member 18 and second wall member 26 provides for accommodating space within second cavity 30 to receive uncured sealant exiting first cavity 20 and preventing uncured sealant exiting second cavity 30. Interior surface 42 of second wall member 26 extends in curvilinear direction 44 from first end 32 of second wall member 26. At least a portion 45 of an interior surface 46 of first wall member 18 extends in a curvilinear direction 47. The curvilinear surfaces of the respective wall members provide ease in manufacturing of cap member 16. Exterior surface 52 of second wall member 26 extends in curvilinear direction 53 from exterior surface 28 of first wall member 18 provides for a smooth continuous outer surface which provides for ease in manufacturing of cap member 16.

Figure 6:
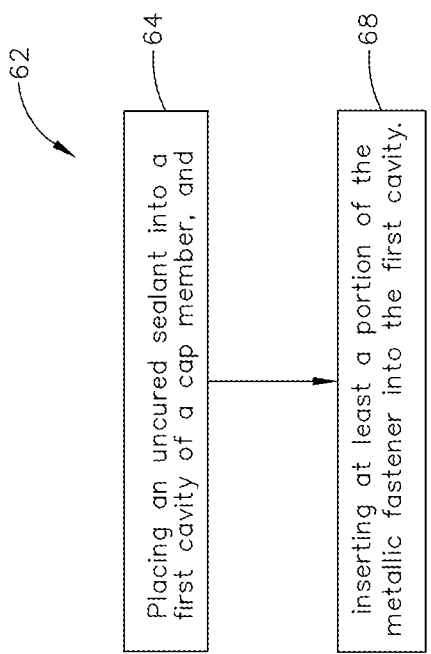
FIG. 6 is a flow chart of a method for installing a containment apparatus for enclosing a metallic fastener extending through a structure.

In referring to FIG. 6, method 62 of installing a containment apparatus 10 for enclosing metallic fastener 12 extending from structure 14 surface 17 includes step 64 of placing uncured sealant 66 into first cavity 20 of cap member 16, which includes first wall member 18, which defines first cavity 20 and first end 22, as seen in FIG. 4. Uncured sealant 66 can include one of a wide variety of chemical compositions such as for example, polysulfide, polythioether, polyurethane, epoxy, acrylate or polyimide. First end 22 defines first opening 24 providing access into first cavity 20 for at least a portion of metallic fastener 12. Second wall member 26 is secured to and extends from exterior surface 28 of first wall member 18, as seen in FIG. 2. Second wall member 26 extends spaced apart from and extends along first wall member 18 to first end 32 of second wall member 26. Second wall member 26 surrounds first wall member 18 such that first wall member 18 and second wall member 26 form second cavity 30 positioned between first wall member 18 and second wall member 26. First end 22 of first wall member 18 and first end 32 of second wall member 26 are coplanar with one another with being positioned in plane P as seen in FIG. 5. Method 62 further includes step 68 of inserting at least a portion of metallic fastener 12 into first cavity 20, as also seen in FIG. 5. Method 62 provides for installation of cap member 16, such that uncured sealant 66 is confined within cap member 16 during installation and does not result in uncured sealant 66 within cap member 16 becoming squeeze out uncured sealant 66 from cap member 16 during installation. In avoiding uncured sealant 66 exiting cap member 16, substantial labor and cost savings can be experienced in not having to smooth out uncured sealant 66 that has exited the cap member 16. In addition, second cavity 30 confines uncured sealant 66 which has come out of first cavity 20 from the insertion of metallic fastener 12 and into second cavity 30 during installation. Uncured sealant 66 confined within second cavity 30, when cured, provides additional securement of cap member 16 to structure 14 to that which is provided by uncured sealant 66 positioned within first cavity 20. Method 62 further includes a step of exerting a force onto cap member 16 in direction 70 toward metallic fastener 12. The step of exerting the force onto the cap member 16 further includes turning cap member 16 in direction 72 about central axis 74 of cap member 16. The application of force toward metallic fastener 12 and turning of cap member 16 provides for a smoothing and thinning out of uncured sealant 66 exiting first cavity 20 with metallic fastener 12 being inserted into first cavity 20.

Method 62 further includes a step of moving uncured sealant 66, as seen in FIG. 5, between first end 22 of first wall member 18 and structure 14. This moving of uncured sealant 66 is facilitated with smoothing and squeezing out of uncured sealant 66 positioned between first end 22 of first wall member 18 and surface 17 of structure 14 with turning of cap member 16 and with exerting the force onto cap member 16. Moving of uncured sealant 66 between first end 22 of wall member 18 allows the displaced uncured sealant from first cavity 20 to move into second cavity 30 and provide ease in installing cap member 16 onto metallic fastener 12 with experiencing little resistance with uncured sealant flowing through and between first end 22 and structure 14. The step of moving further includes positioning uncured sealant 66 which has moved beyond first wall member 18 in alignment with second cavity 30 with first end 22 of first wall member 18 and first end 32 of second wall member 26 positioned spaced apart from structure 14. Positioning uncured sealant 66 in alignment with second cavity 30 provides for ease in confinement of uncured sealant 66 within second cavity 30 when installing cap member 16. Method 62 further includes a step of positioning first end 22 of first wall member 18 and first end 32 of second wall member 26 in abutting relationship with structure 14 with uncured sealant 66 positioned within second cavity 30. With abutting of first end 22 and first end 32 against structure 14, uncured sealant 66 aligned with second cavity 30 is then confined within second cavity 30 and sealed from exiting cap member 16. As a result, uncured sealant 66 that has been squeezed out from first wall member 18 is thereby confined within second cavity 30 by second wall member 26 blocking uncured sealant 66 from squeezing out beyond second wall member 26. Confinement of uncured sealant 66 within cap member 16, as mentioned, reduces labor and cost in not having to smooth out uncured sealant 66 and prevents an occurrence of uncured sealant 66 being positioned on structure 14 outside of cap member 16 and within an environment which can be sensitive to uncured sealant 66. Uncured sealant 66 positioned within first cavity 20, when cured, secures cap member 16 to structure 14 and uncured sealant 66 positioned within second cavity 30, when cured, further secures cap member 16 to structure 14.

While various embodiments have been described above, this disclosure is not intended to be limited thereto. Variations can be made to the disclosed embodiments that are still within the scope of the appended claims.

What is claimed:

1. A containment apparatus for enclosing a metallic fastener extending through a structure, comprising:
    a cap member comprising:
        a first wall member, which defines a first cavity and a first end, wherein the first end defines a first opening providing access into the first cavity for at least a portion of the metallic fastener; and
        a second wall member joined together with the first wall member, wherein:
            the second wall member extends spaced apart from the first wall member and extends along the first wall member continuously to a first end of the second wall member;
            the second wall member surrounds the first wall member such that first wall member and second wall member form a second cavity positioned between the first wall member and the second wall member; and
            the first end of the first wall member and the first end of the second wall member are coplanar with one another.

2. The containment apparatus of claim 1, wherein the first end of the first wall member comprises a flat surface.

3. The containment apparatus of claim 2, wherein the flat surface of the first end extends in a circular direction defining first opening having a circular configuration.

4. The containment apparatus of claim 1, wherein the first wall member and the second wall member is integral with one another.

5. The containment apparatus of claim 4, wherein the first wall member and the second wall member are joined at a location spaced apart from the first end of the first wall member and the first end of the second wall member.

6. The containment apparatus of claim 5, wherein an exterior surface of the second wall member extends in a curvilinear direction from the exterior surface of the first wall member.

7. The containment apparatus of claim 1, wherein the first end of the second wall member comprises a flat surface.

8. The containment apparatus of claim 7, wherein the flat surface of the first end of the second wall member and the flat surface of the first end of the first wall member are spaced apart from one another.

9. The containment apparatus of claim 8, wherein the flat surface of the first end of the second wall member surrounds the flat surface of the first end of the first wall member.

10. The containment apparatus of claim 9, wherein the flat surface of the first end of the second wall member extends in a circular direction.

11. The containment apparatus of claim 1, wherein an interior wall of the second wall member extends in a curvilinear direction from first end of second wall member.

12. The containment apparatus of claim 1, wherein the first end of the first wall member has a flat surface and the first end of the second wall member has a flat surface such that the flat surface of the first wall member and the flat surface of the second wall member provide a concentric configuration.

13. A method of installing a containment apparatus for enclosing a metallic fastener extending from a structure, comprising steps of:
    placing an uncured sealant into a first cavity of a cap member, which comprises:
        a first wall member which defines the first cavity and a first end, wherein the first end defines a first opening providing access into the first cavity for at least a portion of the metallic fastener; and
        a second wall member joined together with the first wall member, wherein:
            the second wall member extends spaced apart from the first wall member and extends along the first wall member continuously to a first end of the second wall member;
            the second wall member surrounds the first wall member such that the first wall member and the second wall member form a second cavity positioned between the first wall member and the second wall member; and
            the first end of the first wall member and the first end of the second wall member are coplanar with one another; and
    inserting at least a portion of the metallic fastener into the first cavity.

14. The method of claim 13, further including a step of exerting a force onto the cap member in a direction toward the metallic fastener.

15. The method of claim 14, wherein the step of exerting the force onto the cap member further includes turning the cap member about a central axis of the cap member.

16. The method of claim 15, further including a step of moving uncured sealant between the first end of the first wall member and the structure.

17. The method of claim 16, wherein the step of moving further includes positioning uncured sealant which has moved beyond the first wall member in alignment with the second cavity with the first end of the first wall member and the first end of the second wall member positioned spaced apart from the structure.

18. The method of claim 17, further including a step of positioning the first end of the first wall member and the first end of the second wall member in abutting relationship to the structure with uncured sealant positioned within the second cavity.

19. The method of claim 18, wherein uncured sealant positioned within the first cavity, when cured, secures the cap member to the structure.

20. The method of claim 18, wherein uncured sealant positioned within the second cavity, when cured, secures the cap member to the structure.

* * * * *